July 22, 1958  S. E. ROSENBERG  2,843,906
GARTER WITH TOGGLE SUPPORT
Filed Aug. 2, 1955

Inventor
Stig E. Rosenberg
by Wright, Brown,
Quinby & May
Attys.

United States Patent Office 2,843,906
Patented July 22, 1958

2,843,906

GARTER WITH TOGGLE SUPPORT

Stig E. Rosenberg, Brockton, Mass.

Application August 2, 1955, Serial No. 525,861

3 Claims. (Cl. 24—201)

This application is a division of my copending application Serial No. 420,481, filed April 2, 1954. The invention relates to a garter or equivalent pendent member having an improved toggle element at its upper end to bear against areas of a girdle or the like adjacent to a slit in the girdle through which the garter extends.

According to the invention a toggle element of desired shape is molded of a suitable moldable material such as soft rubber in a molding die, the end portion of a garter or strip of tape being within the mold during the molding operation so that the molded material is pressed into the face of the end portion of the garter and grips it when the material is set. In the molding operation, moreover, a rib is formed on a face of the toggle element. This rib has a face extending perpendicularly to the face of the toggle element itself. This rib face is molded against the garter or tape and this materially strengthens the union between the toggle element and the garter.

For a more complete understanding of the invention, reference may be had to the following description thereof and to the drawings, of which Figure 1 is a fragmentary elevation of a girdle having garters extending through its front and rear walls;

Figure 1:
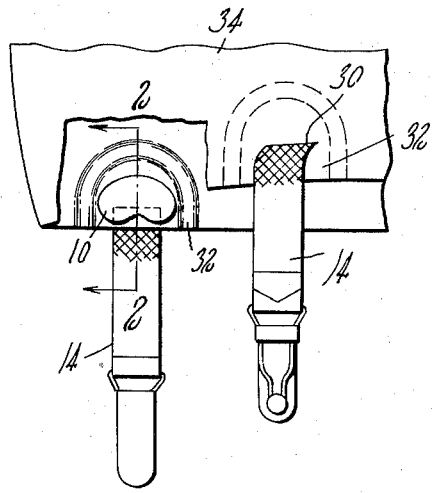

Girdles of deposited latex have come into wide use. Since it is sometimes desirable to wear such girdles with garters attached and sometimes without garters, efforts have been made to provide satisfactory detachable garters. To this end, reinforced areas have been formed adjacent to the bottom edge of the girdle, each area having a horizontal slit therethrough to receive a garter or equivalent flexible pendent member. To keep the garter from pulling out, a toggle element has been attached to the upper end thereof to bear against the areas of the girdle wall adjacent to the slit through which the garter extends, as shown for example in my Patent No. 2,705,798.

According to the present invention, an improved toggle element 10 is molded to the end portion 12 of the garter 14. The toggle element 10 may be of any suitable moldable material capable of being set to take a permanent shape. One such material is soft rubber. A "biscuit" of a suitable rubber mixture is inserted in a mold (not shown) and pressed into the shape of the mold cavity. Heat is applied to vulcanize the rubber mixture. In the mold with the biscuit is the end portion 12 of a tape or garter 14, this end portion being flush with the rear face of the toggle element 10 in the finished product. If desired, a piece of ornamental facing fabric 16 may also be inserted in the mold with the biscuit. The fabric 16 is preferably a smooth textile product which will be suitable for contact with the skin of the wearer. The toggle element 10 may be a flat plate of any suitable shape, the element shown on the drawing being kidney-shaped.

The end portion 12 of the tape is arranged in the mold so that it will extend from the upper edge of the element 10 to a point spaced a short distance from the lower edge thereof. The tape bends sharply at this point and projects from the element substantially at right angles. In the molding operation a rib 18 is caused to exude from the body of the element 10, this rib having a length equal to the width of the tape and having a face 20 substantially at right angles to the plane of the element 10 and pressed into interlocking engagement with the portion of the tape adjacent to the bend. This adds substantial strength to the toggle since the direction of pull on the tape at its point of junction with the toggle element is ordinarily about at right angles to the toggle element and therefore approximately tangential to the plane of the face 20 of the rib 18. Where, as in this case, the tape is bonded to surfaces of the toggle element by the interlocking of surface elements of the rubber with surface fibers of the tape, the greater the angle between the direction of pull and the plane of the interface of the rubber and tape, the less effective is the interlock in preventing separation of the tape and rubber. Hence if the direction of pull is approximately at right angles to the face of the element 10, it will make a very small angle with the plane of the rib face 20. The interlock with this face, though small in area, will hold strongly.

Figure 2:
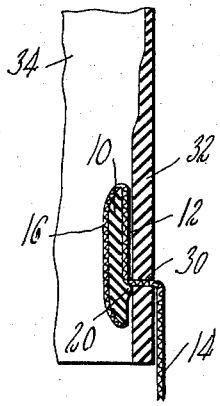
Figure 2 is a section on the line 2—2 of Figure 1, on a larger scale.
Figure 3:
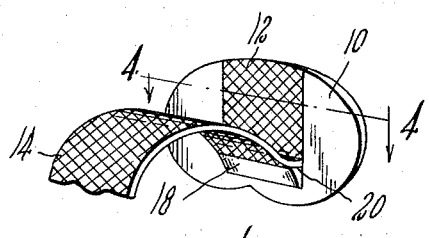
Figure 3 is a perspective view of a toggle element attached to the upper portion of a garter or tape.
Figure 4:
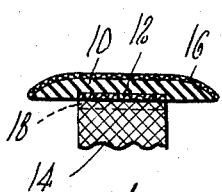
Figure 4 is a section on the line 4—4 of Figure 3.

Figures 1 and 2 illustrate the manner of use of the toggle. The tape 14 extends through a horizontal slit 30 in a reinforced area 32 at the lower edge of a girdle 34 of deposited latex. The length of each slit 30 is preferably about equal to the width of the tape 14 which extends through it.

Figure 5:
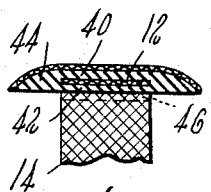
Figure 5 is a section similar to Figure 4 but of a slightly modified form of the invention.

A slight modification of the toggle is shown in Figure 5. Instead of inserting the end portion 12 of the tape against a face of the mold, the end portion of the tape is embedded between layers 40 and 42 of rubber in the toggle element 44. As before, a rib 46 is formed on the face of the element against a portion of the tape extending at right angles from the element 44.

I claim:

1. A tape having a toggle device at an end thereof, said device comprising a molded plate having an end portion of said tape extending part way across the rear face of the plate and embedded in said face, said plate having an integral rib on the rear face thereof with a face substantially perpendicular to said rear face, said tape having a portion thereof against and interlocked with said face of the rib.

2. A tape and toggle device as in claim 1, said plate having a piece of textile fabric covering the front face thereof.

3. A tape and toggle device as in claim 1, said plate consisting chiefly of soft vulcanized rubber.

References Cited in the file of this patent

UNITED STATES PATENTS

| 1,159,559 | White | Nov. 9, 1915 |
| 2,093,231 | Broadwell | Sept. 14, 1937 |
| 2,099,135 | O'Neill | Nov. 16, 1937 |
| 2,276,321 | Lindahl | Mar. 17, 1942 |

FOREIGN PATENTS

| 464,035 | Great Britain | Apr. 12, 1937 |